United States Patent
Hirayama et al.

(10) Patent No.: US 6,324,618 B1
(45) Date of Patent: Nov. 27, 2001

(54) OPTICAL DISK REPRODUCING APPARATUS

(75) Inventors: Hiroshi Hirayama; Osamu Kawamae; Masayuki Hirabayashi; Yutaka Nagai; Toshifumi Takeuchi, all of Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/563,433

(22) Filed: May 3, 2000

Related U.S. Application Data

(60) Continuation of application No. 09/084,931, filed on May 28, 1998, now Pat. No. 6,076,135, which is a division of application No. 08/669,245, filed on Jun. 24, 1996, now Pat. No. 5,966,721.

(30) Foreign Application Priority Data

Jun. 26, 1995 (JP) .................................................. 7-158931

(51) Int. Cl.[7] .................................................. B11B 7/24
(52) U.S. Cl. ............... 711/4; 711/1; 711/4; 711/112; 711/154; 360/48; 360/32; 360/71; 360/39; 360/72.1
(58) Field of Search .................. 711/1, 4, 112, 711/154; 60/48, 71, 32, 39, 72.1; 369/59

(56) References Cited

U.S. PATENT DOCUMENTS

| | | | |
|---|---|---|---|
| 5,293,565 | 3/1994 | Jacquette et al. | 369/32 |
| 5,428,597 | 6/1995 | Satoh et al. | 369/275.1 |
| 5,523,903 | 6/1996 | Hetzler et al. | 360/77.08 |
| 5,608,715 | 3/1997 | Yokogawa et al. | 369/275.1 |
| 5,661,848 | 8/1997 | Bonke et al. | 711/112 |
| 5,966,721 | * 10/1999 | Hirayama et al. | 711/4 |
| 6,076,135 | * 6/2000 | Hirayama et al. | 711/4 |

FOREIGN PATENT DOCUMENTS

| | | |
|---|---|---|
| 3828519 | 3/1990 | (DE) . |
| 4023148 | 1/1991 | (DE) . |
| 0593032 | 4/1994 | (EP) . |
| 0715301 | 6/1996 | (EP) . |

(List continued on next page.)

OTHER PUBLICATIONS

*Patent Abstracts of Japan,* English abstracts of Japanese reference 62–42343 published on Feb. 24, 1987.

(List continued on next page.)

*Primary Examiner*—Than Nguyen
(74) *Attorney, Agent, or Firm*—Antonelli, Terry, Stout & Kraus, LLP

(57) ABSTRACT

An optical disk reproducing apparatus for reproducing digital signals in the form of a data frame including a lead-in block and data blocks from an optical disk including at least first and second recording surfaces each being readable from a same side of the optical disk. The data blocks include block addresses and data, and are recorded on the first and second recording surfaces. The lead-in block is recorded at a head of the data frame and includes disk information relating to a number of data blocks recorded on the first and second recording surfaces. The apparatus includes an optical pickup, a focus control circuit, a pickup movement control circuit, a disk information detection circuit which detects disk information included in a reproduced lead-in block, a block address detection circuit which detects block addresses included in reproduced data blocks, and an access/reproduction control circuit which controls the focus control circuit and the pickup movement control circuit to access the first and second recording surfaces and reproduce data blocks recorded thereon. The access/reproduction control circuit controls the focus control circuit to perform focus changing of the optical pickup to access the first and second recording surfaces in accordance with block addresses of data blocks to be reproduced and the detected disk information.

5 Claims, 4 Drawing Sheets

FOREIGN PATENT DOCUMENTS

| | | |
|---|---|---|
| 2235565 | 3/1991 | (GB) . |
| 62-42343 | 2/1987 | (JP) . |
| 2-103732 | 4/1990 | (JP) . |
| 6-236555 | 8/1994 | (JP) . |
| 8-45195 | 2/1996 | (JP) . |
| 8-96406 | 4/1996 | (JP) . |
| 8-212561 | 8/1996 | (JP) . |

OTHER PUBLICATIONS

*Patent Abstracts of Japan*, English abstract of Japanese reference 2–103732 published on Apr, 16, 1990.

*Nikkei Byte,* Sep. 1994, p. 146 (in Japanese).

"Confidence in Unique Standards of DVDs", *Nikkei Sangyo Shinbun,* Feb. 24, 1995 (in Japanese).

"CD–ROM, CD–I und VIDEO–CD", *Elektor,* Mar. 1995, pp. 52–56 (in German).

"Second Stage of Struggle for DvD Standards", *Nihon Keizai Shinbun,* Apr. 20, 1995 (in Japanese).

*Nikkei Byte,* Sep. 1995, pp. 129–130 (in Japanese).

*Patent Abstracts of Japan,* English abstract of Japanese reference 8–45195 published on Feb. 16, 1996.

*Patent Abstracts of Japan,* English abstract of Japanese reference 8–96406 published on Apr. 12, 1996.

*Patent Abstracts of Japan,* English abstract of Japanese reference 8–212561 published on Aug. 20, 1996.

U.S. application No. 09/339,816, filed on Jun. 25, 1999.

U.S. application No. 09/342,045, filed on Jun. 28, 1999.

U.S. application No. 09/342,175, filed on Jun. 29, 1999.

U.S. application No. 09/343,200, filed on Jun. 30, 1999.

* cited by examiner

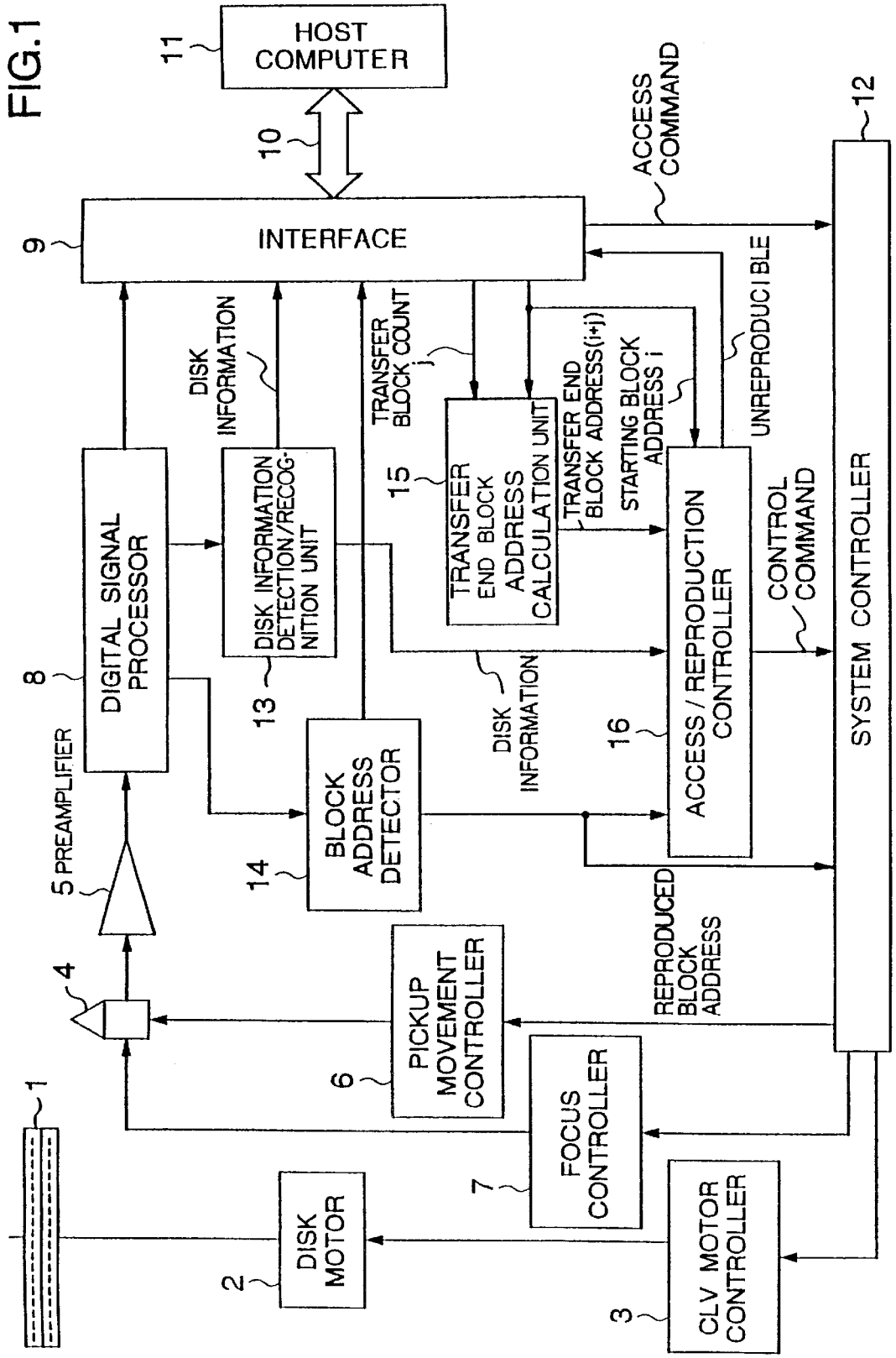

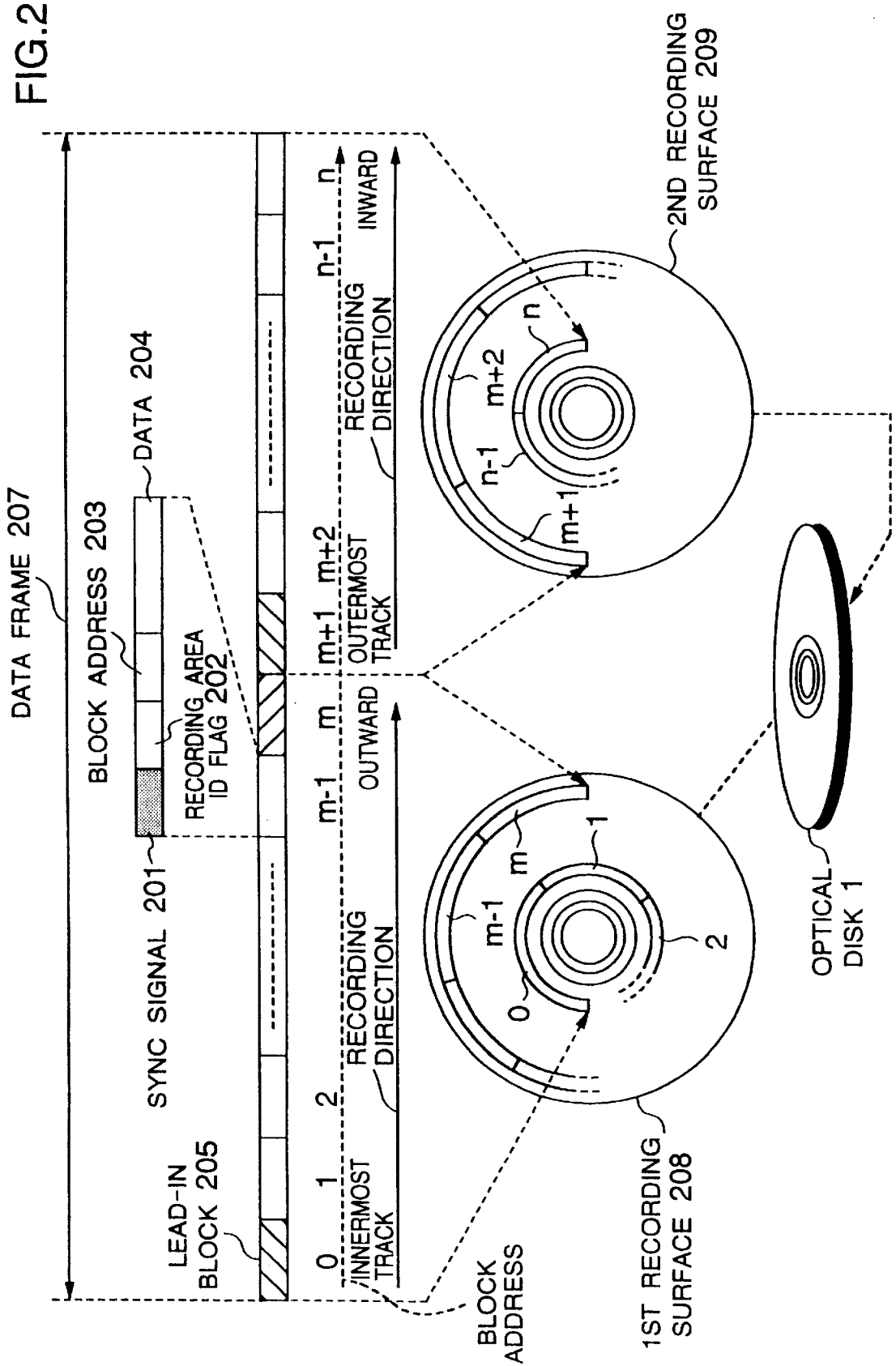

FIG.3

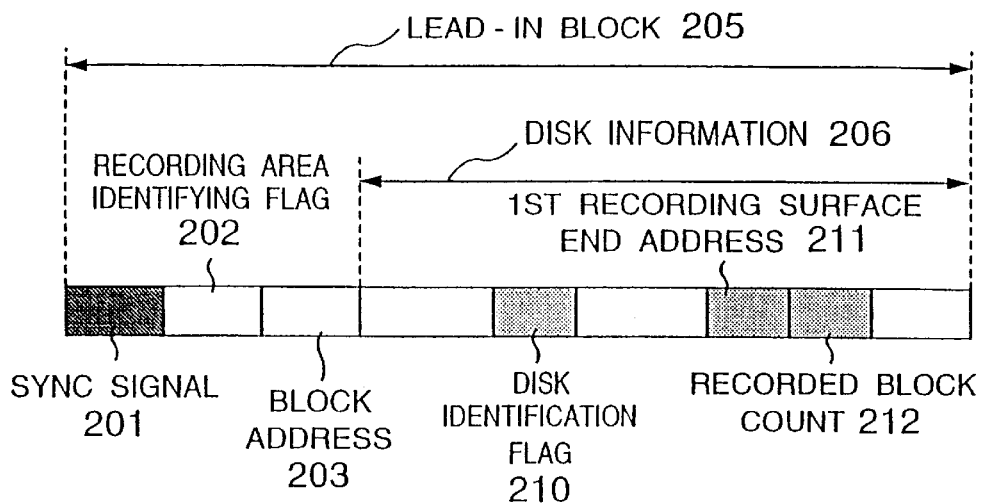

FIG.4

| DISK IDENTI-FICATION FLAG | RECORDING SURFACE COUNT | DATA FRAME RECORDING METHOD |
|---|---|---|
| 00 | 1 | ONE DATA FRAME IS RECORDED ON ONE RECORDING SURFACE |
| 10 | 2 | TWO DATA FRAMES ARE EACH RECORDED ON ONE RESPECTIVE RECORDING SURFACE |
| 11 | 2 | THE AREA OF ONE DATA FRAME IS DIVIDED INTO n BLOCKS. THE FIRST m BLOCKS ARE RECORDED ON A FIRST RECORDING SURFACE AND THE REMAINING BLOCKS ARE RECORDED ON A SECOND RECORDING SURFACE. m<n. |

OPTICAL DISK REPRODUCING APPARATUS

This application is a continuation of application Ser. No. 09/084,931 filed on May 28, 1998, now U.S. Pat. No. 6,076,135, which is a division of application Ser. No. 08/669,245 filed on Jun. 24, 1996, now U.S. Pat. No. 5,966,721.

BACKGROUND OF THE INVENTION

The present invention relates to digital signal recording methods and disk reproducing apparatus, and more particularly to such method and device for recording a digital signal in the form of a data block on a disk and adapted to be accessed by a host computer and for reproducing the digital signal from the disk.

Conventionally, a CD-ROM (CD-Read Only Memory) is named as a disk on which digital signals are recorded in units of a data block of this type. Like the techniques described in "Nikkei Byte" September 1994, p. 146, in the CD-ROM, data blocks composed of effective data and its block address are recorded outward in order from the innermost track on the recording surface of the disk. When such disk on which such data is recorded, using the above technique, is accessed and reproduced in accordance with a command from the host computer, a start block address and a transfer block length are designated along with the access command, and a desired data block is accessed and reproduced in accordance with such command and data.

Recently, disks each composed of two subdisks stuck to each other whose recording surfaces are readable from one side, disks having an upper and a lower recording surface whose recording surfaces are readable from one side, and disks each composed of two stuck sets of upper and lower recording surfaces which are readable from one side have been standardized. Refer to for example, the headline "Confidence in Unique Standards of DVDS", *Nikkei Sangyo Shinbun,* Feb. 24, 1995, and the headline "Second Stage of Struggle for DVD Standards", *Nihon Keizai Shinbun,* Apr. 20, 1995.

When a digital signal is recorded, using the above-mentioned technique, on any of those disks having a plurality of recording surfaces, the host computer is only recognized as disks independent for the respective recording surfaces. In order to enable all the recording surfaces to be accessed, the interface via which data is sent/received to/from the host computer is required to be changed, and hence the conventional interface as it is cannot be used.

The above-mentioned techniques have the problem that each time a recording surface to be reproduced is changed to read the innermost lead-in area before access and reproduction, it takes much time to resume the access.

SUMMARY OF THE INVENTION

It is therefore an object of the present invention to provide a digital signal recording method and a disk reproducing apparatus which are capable of accessing at high speed all the recording surfaces present in the disk and reproducing a digital signal, using the existing interface as it is.

In order to solve the above problem, in the digital signal recording method according to the present invention, a data frame is constructed which includes n (which is a natural number) data blocks (or data block each containing a synchronization signal) recordable on a first and a second digital signal recording surface present on a disk and readable from one side of the disk, each data block being composed of a synchronization (sync) signal indicative of the boundary between the two data blocks, a block address indicative of the address of a data block on the recording medium, and data.

Further provided to the head of the data frame is a lead-in block of the same type as the data block and including information composed of the range of block addresses recorded on each of the recording surfaces of the disk, the configuration of the data frame, and a flag to identify the method of reproducing those data. The lead-in block and the data blocks of block addresses 1 to m (where m is smaller than a natural number n) of the data frame are recorded on the first recording surfaces of the disk and data blocks of block addresses (m+1) to n are recorded on the second recording surface. The disk has a multilayered structure with the corresponding recording surfaces. The first to m-th data blocks are arranged outward from the innermost track on the first recording surface and the (m+1)th to n-th data blocks are arranged inward from the outermost track on the second recording surface so as to enable data blocks to be traced continuously.

The reproducing apparatus comprises means for processing a digital signal in a predetermined format recorded on the disk, means for sending/receiving commands and data to/from a host computer, means for controlling the whole device in accordance with a command obtained by the sending/receiving means, means for moving a signal pickup to a desired position on the disk, means for controlling the focus of the pickup and for accessing the recording surfaces selectively, means for controlling the rotational speed of a disk motor, means for detecting and recognizing the range of block addresses recorded on a respective one of the recording surfaces of the disk contained in the information in the lead-in block, the configuration of a data frame to be recorded and a flag to identify a method of reproducing such data, means for detecting the block address of a reproduced data block, means for calculating a block address in which the reproduction ends in accordance with a command from the host computer, and means for generating a command which controls the access to the disk and reproduction of a signal from the disk in accordance with the information obtained by the detection and recognition of the flag, the detected block address and the result of the calculation.

According to such structure, since consecutive block addresses are allocated to the respective data blocks recorded on all the recording surfaces of the disk, all the recording surfaces of the disk are accessed and reproduced at high speed by using the conventional interface.

Other objects, features and advantages of the invention will become apparent from the following detailed description of embodiments of the invention taken in conjunction with the accompanying drawings.

BRIEF DESCRIPTION OF THE DRAWINGS

FIG. 1 shows the structure of one embodiment of a digital signal recording method and reproducing apparatus according to the present invention;

FIG. 2 illustrates the structure of a data frame used in the embodiment of FIG. 1;

FIG. 3 illustrates the structure of a lead-in block 205 of FIG. 2;

FIG. 4 illustrates the structure of a disk identification flag 210 of FIG. 2.

DESCRIPTION OF THE PREFERRED EMBODIMENT

Figure 5:
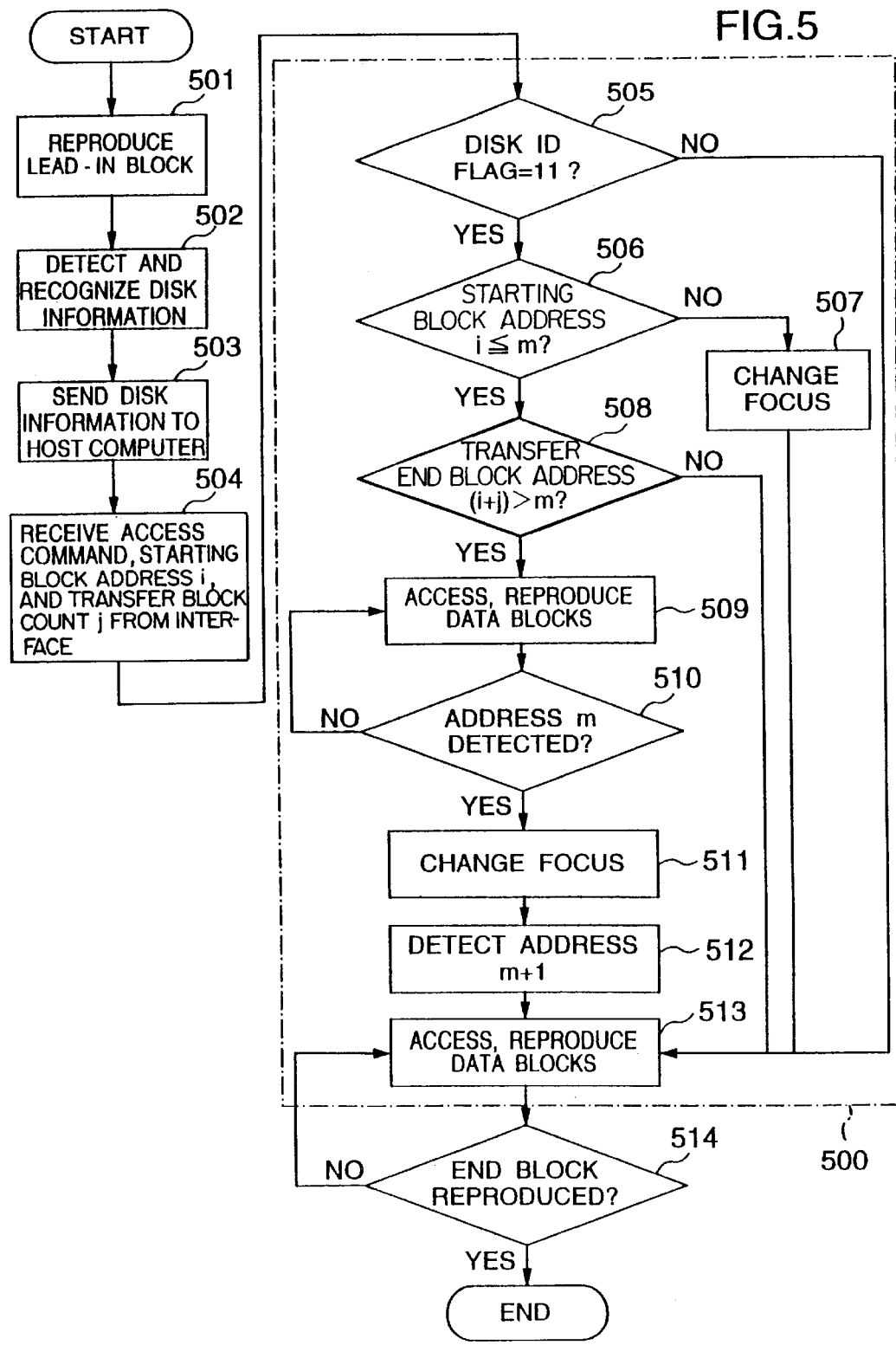
FIG. 5 is a flow chart indicative of an algorithm for signal processing in the embodiment of FIG. 1.

A preferred embodiment of the present invention will be described with reference to the drawings.

FIG. 1 shows one embodiment of a disk reproducing apparatus according to the present invention in a block diagram. Reference numeral 1 denotes an optical disk having a multi-layered (two-layers or more) recording surfaces; 2, a disk motor; 3, a constant linear velocity (CLV) motor controller; 4, an optical pickup which is capable of tracing a specified one of the multi-layered recording surfaces by focus changing; 5, a preamplifier 6; a pickup movement controller; 7, a focus controller; 8, a digital signal processing circuit (processor); 9, an interface; 10, an interface bus; 11, a host computer; 12, a system controller; 13, a disk information detection/recognition unit; 14, a block address detector; 15, a transfer end block address calculation unit; and 16, an access/reproduction controller. The functions of the elements 15 and 16 may be implemented by reading programs stored in a medium such as a ROM or a floppy disk and executing the programs by a processor.

In FIG. 1, the optical disk 1 contains digital signals recorded through the first and second recording surfaces of the disk to be transferred to the host computer 11 and readable from one side. The disk 1 is rotated at a constant linear velocity by the disk motor 2 controlled by the CLV motor controller 3, so that a digital signal is reproduced by the optical pickup 4 from the disk 1. At this time, by the pickup movement controller 6, tracking control of the optical pickup 4 is provided and the focus control is provided by the focus controller 7 when one of the first and second recording surfaces is selected and accessed.

The structure of the optical disk 1 and the digital signal to be recorded will be described next with reference to FIGS. 2–4.

As shown in FIG. 2, one data block corresponding to a sector as a minimum unit which is recorded on the disk 1 is composed of a sync signal 201 indicative of the boundary between the two data blocks, a recording area identification flag 202 which identifies an area on the disk in which a data block is to be recorded, a block address 203 indicative of the address of the data block on the disk, and data 204.

As described above, the disk has the first and second recording surfaces readable from one side. N data blocks are arranged in order of recording on the disk and consecutive addresses "1" to "n" are stored at corresponding addresses 203 of the data blocks. The lead-in block 205 having a structure shown in FIG. 3 is provided to the head of arrangement of data blocks to thereby compose a data frame.

The lead-in block 205 indicative of the constitution information has a structure similar to that of the data block. Disk information 206 is stored in a data area, a disk identification flag 210 having a structure of FIG. 4 is stored in a part of an area of the disk information 206, and a frame head address "0" is stored at a block address 203.

When consecutive data frames 207 thus produced are recorded on the disk 1, the data blocks including the lead-in block at block addresses "0" to "m" (which is a natural number smaller than n) are recorded outward from the innermost track on the first recording surface 208. The data blocks at addresses (m+1) to n are recorded inward from the outermost track on the second recording surface 209.

A flag "11" is then stored in the disk identification flag 210, a first recording surface end address 211 indicative of the address of a data block recorded last on the first recording surface and a recorded block count 212 indicative of a block data count n recorded on the disk are recorded in a part of the disk information area 206.

A single optical disk is constituted which has the first and second recording surface superposed and recorded in the format mentioned above.

Reproduction of digital data from the disk 1 will be described next with reference to the block diagram of FIG. 1 and the flow chart of FIG. 5.

In FIGS. 1 and 5, the innermost track on the first recording surface of the disk 1 is accessed with the pickup 4 before reproduction of the recorded data to reproduce the lead-in block 205 (step 501 of FIG. 5), predetermined signal processing including detection of the sync signal 201 and error correction is performed in the digital signal processor 8, the information in the disk information 206 is detected and recognized in the disk information detection/recognition circuit 13 (step 502). The detected disk information is delivered to the interface 9 which then delivers the disk information to the host computer 11 via the interface bus 10 in accordance with a predetermined protocol (step 503). The host computer 11 sends an access command, a starting block address i at which the block data starts to be accessed, and a transfer block count j to the interface 9 in dependence on the received disk information and in accordance with a predetermined protocol (step 504).

When the interface 9 receives a command from the host computer 11, the access reproduction controller 16 controls the access and reproduction in accordance with the disk identification flag 210 of the disk information 206 detected previously.

If the detected identification flag 210 is other than the flag "11" indicative of a recording format to be dealt with in the invention (step 505), the access/reproduction controller 16 delivers to the system controller 12 a control command to reproduce j blocks of consecutive addresses starting from the starting block address i in the disk. The system controller 12 then controls the CLV motor control circuit 3 and the pickup movement controller 6 to perform access/reproduction (steps 513 and 514). The reproduced data is then sent to the host computer 10 via the digital signal processor 8, interface 9 and interface bus 10.

If the detected identification flag 210 is "11", it is determined that the disk has been recorded in the method of FIG. 2. At step 506, the transfer starting block address i is compared in magnitude with the outermost track block address m of the first recording surface obtained by detection of the first recording end address 211 of the lead-in block to select a recording surface at which the access is to be started. If i is greater than m, the block address at which the access is to be started is present on the second recording surface. Thus, the focus of the pickup is changed (step 507), the j-th data block from that of the start address i on the second recording surface is accessed and reproduced (steps 513 and 514). In order to change the focus, the conventional technique, for example, disclosed in "Nikkei Byte", September 1995, pp. 129–130, especially in FIG. 2, may be used.

If i is not larger than m, the starting block address i exists on the first recording surface. Thus, the transfer end address calculation unit 15 calculates the block address (i+j) where the reproduction ends on the basis of the starting block address i and the transfer block count j. The result of the calculation (i+j) is compared with the recorded block count n obtained by detection of the recorded block count 212 in the access/reproduction control unit 16. If (i+j) is greater than n, the reproduction ends midway and the inability to reproduce the digital signal is reported via the interface 9 to the host computer 11.

The result of the calculation is compared with the outermost track block address m on the first recording surface at step 508. If (i+j) is not greater than m, it is determined that all the data blocks to be reproduced are on the first recording surface. Thus, the j-th data block is accessed from the block address i and reproduced (steps 513 and 514).

If (i+j) is greater than m, it is determined that the data block to be reproduced exists in succession over the first and second recording surfaces. In this case, the data blocks start first to be accessed at a block address i on the first.recording surface and continue to be reproduced until a block address m is detected by the block address detector 14 (steps 509, 510). If the block address m is detected, the focus of the pickup is changed to access the second recording surface and hence a data block at address (m+1) existing on the outermost track of the second recording surface (step 511) to detect the block address (m+1) (step 512). Access to and reproduction of data blocks starting at the block address (m+1) is then reopened (step 513) until the data block of end block address (i+j) is reproduced (step 514). The block 500 involving the steps 505–513 fulfills the functions of the elements 15 and 16 of FIG. 1. The programs corresponding to the respective steps in the block 500 are stored in the recording medium, as mentioned above.

As described above, in the embodiment, when a digital signal is recorded on a disk which has the first and second recording surfaces readable from a side thereof, n data blocks recordable throughout all the recording surfaces of the disk are arranged in order of recording, a lead-in block containing disk information is provided to the head of the arrangement of n data blocks to thereby compose a data frame. The lead-in block and the data blocks of block address 1–m are recorded outward from the innermost track on the first recording surface and the blocks at addresses (m+1) to n are recorded inward from the outermost track on the second recording surface. Thus, since the consecutive block address are assigned throughout all the recording surfaces of the disk, all the recording surfaces of the disk are accessed and reproduced while employing the conventional interface.

The reproducing apparatus detects disk information recorded in the lead-in block and controls the system controller 12 in accordance with the detected information to thereby access and reproduce information in the disk recorded in the present embodiment.

When the data blocks are reproduced continuously throughout the first and second recording surfaces in the recording method of this embodiment, the quantity of movement of the pickup is minimized to thereby achieve high-speed access to the second recording surface.

While in the embodiment the disk which has the first and second recording surfaces readable from a side has been illustrated, the present invention is not limited to this particular case. For example, the present invention is applicable to disks which have three or four surfaces readable from a side. In this case, when the data blocks to be recorded continue from the second recording surface to the third recording surface, the data blocks are assigned outward from the innermost track on the third recording surface for recording or reproducing purposes.

The structure and storage position of the disk identification flag 210, and the storage positions of the first recording surface end address 211 and the recording block count 212 included in the disk information are not limited to the particular embodiment, but may be modified depending on the various disk types.

The recording directions of the data frame in the first and second recording surfaces are not limited to those illustrated in the embodiment. The arrangement to be employed is required to minimize the quantity of movement of the reproduction pickup between the recording surfaces. For example, consecutive data blocks may be recorded inward from the outermost track on the first recording surface and recorded outward from the innermost track on the second recording surface.

What is claimed is:

1. An optical disk reproducing apparatus for reproducing digital signals from an optical disk, the optical disk including at least a first recording surface and a second recording surface each being readable from a same side of the optical disk, the digital signals being in the form of a data frame, the data frame including a lead-in block and a plurality of data blocks, each of the data blocks including a block address assigned to the data block, and data, the data blocks being recorded on the first recording surface and the second recording surface, the lead-in block being recorded at a head of the data frame and including disk information relating to a number of data blocks recorded on the first recording surface and the second recording surface, the optical disk reproducing apparatus comprising:
   an optical pickup which picks up and reproduces digital signals from the optical disk;
   a focus control circuit which performs focus control of the optical pickup;
   a pickup movement control circuit which performs tracking control of the optical pickup;
   a disk information detection circuit which detects disk information included in a reproduced lead-in block based on the digital signals reproduced by the optical pickup;
   a block address detection circuit which detects block addresses included in reproduced data blocks based on the digital signals reproduced by the optical pickup; and
   an access/reproduction control circuit which controls the focus control circuit and the pickup movement control circuit to access the first recording surface and the second recording surface and reproduce data blocks recorded on the first recording surface and the second recording surface;

wherein the access/reproduction control circuit controls the focus control circuit to perform focus changing of the optical pickup to access the first recording surface and the second recording surface in accordance with block addresses of data blocks to be reproduced and the disk information detected by the disk information detection circuit.

2. An optical disk reproducing apparatus according to claim 1, wherein the access/reproduction control circuit controls the focus control circuit to perform focus changing of the optical pickup to access one of the first recording surface and the second recording surface as a target recording surface, determines, after access of the target recording surface, a moving direction of the optical pickup in a radial direction of the optical disk in accordance with block addresses detected by the block address detection circuit and block addresses of data blocks to be reproduced, and controls the pickup movement control circuit in accordance with a result of the determination to reproduce data blocks including block addresses of data blocks to be reproduced.

3. An optical disk reproducing apparatus according to claim 1, wherein the disk information includes information indicative of an end block address of the first recording surface and an end block address of the data frame; and wherein the access/reproduction control circuit compares block addresses of data blocks to be reproduced with the disk information detected by the disk information detection circuit, and controls the focus control circuit in accordance with a result of the comparison to perform focus changing of the optical pickup to access at least one of the first recording surface and the second recording surface.

4. An optical disk reproducing apparatus according to claim 3, wherein the access/reproduction control circuit controls the focus control circuit to perform focus changing of the optical pickup to access one of the first recording surface and the second recording surface as a target recording surface, determines, after access of the target recording surface, a moving direction of the optical pickup in a radial direction of the optical disk in accordance with a result of a comparison between block addresses obtained after access of the target recording surface and block addresses of data blocks to be reproduced, and controls the pickup movement control circuit in accordance with a result of the determination to reproduce data blocks including block addresses of data blocks to be reproduced.

5. An optical disk reproducing apparatus according to claim 1, wherein the disk information includes information indicative of an end block address of the first recording surface and an end block address of the data frame; and wherein the access/reproduction control circuit compares block addresses detected by the block address detection circuit with the disk information detected by the disk information detection circuit, and controls the focus control circuit in accordance with a result of the comparison to perform focus changing of the optical pickup upon continuously reproducing from a data block recorded last on the first recording surface to a data block recorded first on the second recording surface.

* * * * *